(12) United States Patent
Vutukuri

(10) Patent No.: US 10,264,453 B2
(45) Date of Patent: *Apr. 16, 2019

(54) REQUESTING SYSTEM INFORMATION

(71) Applicant: BlackBerry Limited, Waterloo (CA)

(72) Inventor: Eswar Vutukuri, Havant (GB)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/995,416

(22) Filed: Jun. 1, 2018

(65) Prior Publication Data

US 2018/0279129 A1    Sep. 27, 2018

Related U.S. Application Data

(63) Continuation of application No. 15/342,973, filed on Nov. 3, 2016, now Pat. No. 10,009,768.

(51) Int. Cl.
| | |
|---|---|
| *H04W 12/06* | (2009.01) |
| *H04W 48/14* | (2009.01) |
| *H04W 12/08* | (2009.01) |
| *H04W 74/08* | (2009.01) |
| *H04W 88/02* | (2009.01) |

(52) U.S. Cl.
CPC .......... *H04W 12/06* (2013.01); *H04W 12/08* (2013.01); *H04W 48/14* (2013.01); *H04W 74/0833* (2013.01); *H04W 88/02* (2013.01)

(58) Field of Classification Search
CPC . H04W 12/06; H04W 12/08; H04W 74/0833; H04W 88/02

USPC .......................................... 455/411; 370/252
See application file for complete search history.

(56) References Cited

U.S. PATENT DOCUMENTS

| | | | |
|---|---|---|---|
| 2003/0139200 A1* | 7/2003 | Kaji | H04M 1/72525 455/554.1 |
| 2006/0092878 A1* | 5/2006 | Shirota | H04W 36/0005 370/331 |
| 2012/0011360 A1* | 1/2012 | Engels | H04L 9/006 713/166 |
| 2016/0212132 A1* | 7/2016 | Banerjee | H04L 63/10 |
| 2016/0234736 A1* | 8/2016 | Kubota | H04W 36/0083 |
| 2016/0242231 A1 | 8/2016 | Vajapeyam | |

(Continued)

FOREIGN PATENT DOCUMENTS

| | | |
|---|---|---|
| EP | 2611071 | 7/2013 |
| WO | 2008044664 | 4/2008 |

OTHER PUBLICATIONS

EPS Identification, Authentication and Key Agreement, Key Derivation and Traffic Protection Graphic: <http://michau.benoit.free.fr/EPS-AKA_full-sec.png>.

(Continued)

*Primary Examiner* — Michael Y Mapa
(74) *Attorney, Agent, or Firm* — Fish & Richardson P.C.

(57) ABSTRACT

Systems and methods to request system information are provided. In some aspect, a user equipment (UE) transmits a request for on-demand system information. The UE transmits a challenge response for authentication of the request for the on-demand system information. The UE receives the on-demand system information after the request for the on-demand system information is authenticated based on the challenge response.

18 Claims, 9 Drawing Sheets

(56) References Cited

U.S. PATENT DOCUMENTS

2016/0309328 A1 10/2016 Zhang

OTHER PUBLICATIONS

3GPP TS 35.205, "3rd Generation Partnership Project; Technical Specification Group Services and System Aspects; 3G Security; Specification of the MILENAGE Algorithm Set: An example algorithm set for the 3GPP authentication and key generation functions f1, f1*, f2, f3, f4, f5 and f5*; Document 1: General (Release 13)," 3GPP TS 35.205 V13.0.0, Jan. 2016; 15 pages.

3GPP TR 38.913, "3rd Generation Partnership Project; Technical Specification Group Radio Access Network; Study on Scenarios and Requirements for Next Generation Access Technologies; (Release 14)," 3GPP TR 38.913 V1.0.0, Oct. 2016; 39 pages.

3GPP TR 35.909, "3rd Generation Partnership Project; Technical Specification Group Services and System Aspects; 3G Security; Specification of the MILENAGE Algorithm Set: An example algorithm set for the 3GPP authentication and key generation functions f1, f1*, f2, f3, f4, f5 and f5*; Document 5: Summary and results of design and evaluation (Release 13)," 3GPP TR 35.909 V13.0.0, Jan. 2016; 28 pages.

Intel Corporation, "3GPP TSG-RAN WG2 Meeting #95; R2-165007; System information for standalone NR deployment," 3rd Generation Partnership Project (3GPP) Draft, Mobile Competence Centre, Aug. 21, 2016, 6 pages.

Samsung, "3GPP TSG-RAN WG2 Meeting #95; R2-164693; System Information Signalling Resign in NR," 3rd Generation Partnership Project (3GPP) Draft, Aug. 21, 2016, 6 pages.

Blackberry, "3GPP TSG-RAN Wg2 Meeting #96; R2-168359; Handling of SI requests from unauthenticated Ues in NR," #rd Generation Partnership Project (3GPP) Draft, Nov. 4, 2016, 2 pages.

Office Action issued in U.S. Appl. No. 15/342,973 dated Aug. 11, 2017.

Office Action issued in U.S. Appl. No. 15/342,973 dated Dec. 5, 2017; 25 pages.

European Search Report in European Application No. 17198382.8, dated Jan. 31, 2018, 133 pages.

* cited by examiner

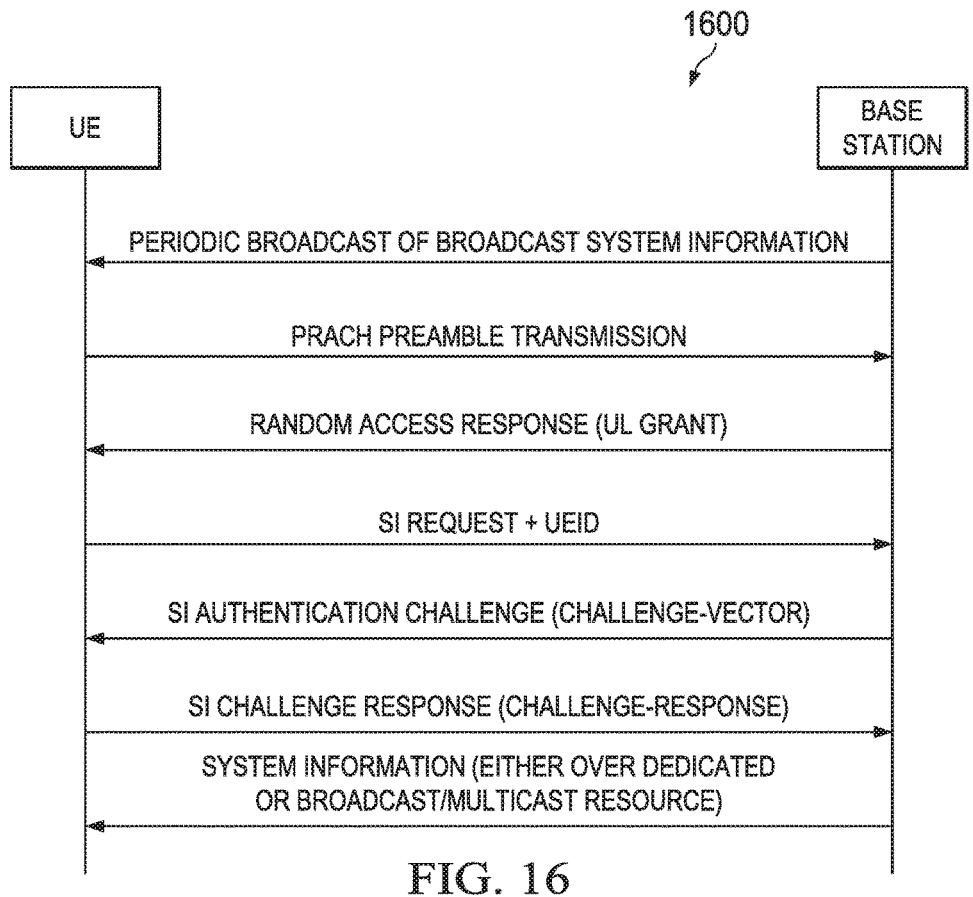
FIG. 16
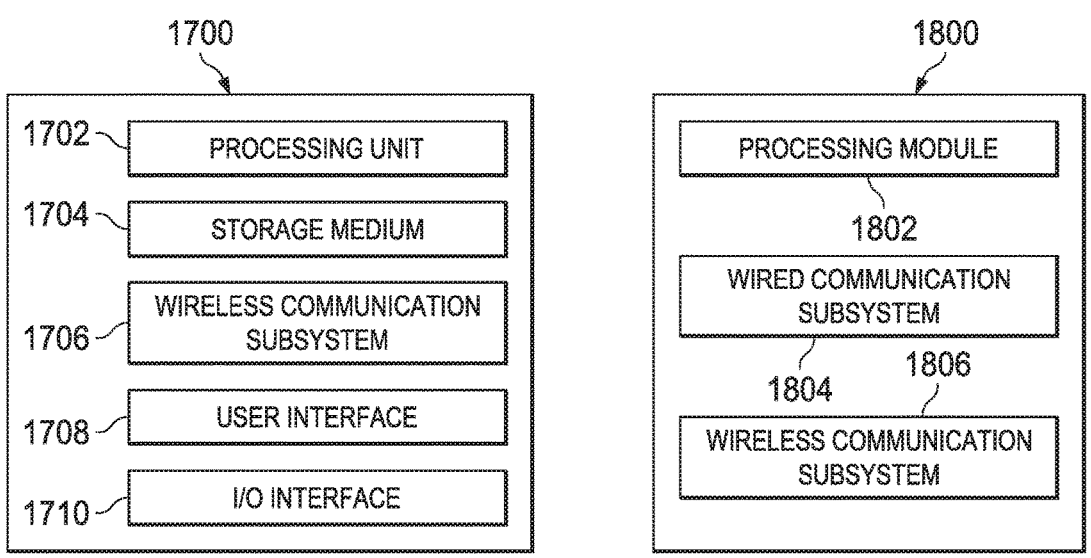
FIG. 17
FIG. 18

REQUESTING SYSTEM INFORMATION

CROSS REFERENCE TO RELATED APPLICATION

This patent is a continuation of and claims the benefit of U.S. Non-Provisional application Ser. No. 15/342,973, filed Nov. 3, 2016, the entire contents of which is hereby expressly incorporated by reference herein in its entirety.

TECHNICAL FIELD

This disclosure relates to data transmission in communication systems and, more specifically, to requesting system information.

BACKGROUND

In a telecommunication network, e.g., a Long Term Evaluation (LTE) network or a next generation 5G network, system information (SI) can include information parameters associated with one or more cells in the network. In some cases, the SI can include a Master Information Block (MIB) and one or more System Information Blocks (SIBs), e.g., SIB1, SIB2 etc. The system information can be broadcasted and periodically repeated. The transmission time and periodicity for some SI can be specified by one or more standard specifications. The transmission time and periodicities of other SI can be configured by a base station for a cell and broadcasted to the user equipments (UEs) in the cell.

DESCRIPTION OF DRAWINGS

FIG. 16 is an example flow diagram illustrating a different process for transmitting the SI request in a message subsequent to the PRACH preamble according to an implementation.

FIG. 17 is a block diagram illustrating an example user equipment (UE) device.

FIG. 18 is a block diagram illustrating an example base station device.

Like reference numbers and designations in the various drawings indicate like elements.

DETAILED DESCRIPTION

Figure 1:
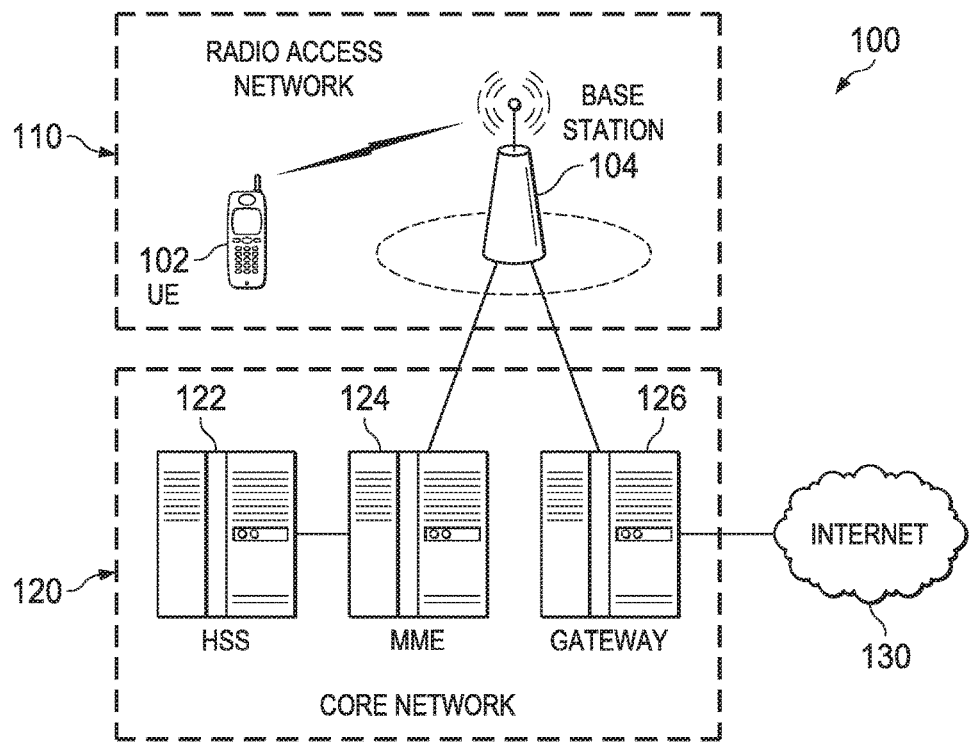
FIG. 1 is an example wireless communication system according to an implementation.

The present disclosure is directed to requesting system information. In some cases, system information (SI) are common for user equipments (UEs) in a cell. SI can be transmitted to the UEs in the cell using a broadcast channel. The broadcast channel can be received by the UEs within the coverage area of the cell. In some cases, the coverage or the capacity of the broadcast channel can be limited. For example, in a radio access technology (RAT) that uses a very high transmission frequency, a rotating narrow beam can be used to transmit broadcast channels that can reach the cell edge. The beam may have a limited capacity and thus may not be able to carry all the SI in the cell. Examples of these RATs can include a $5^{th}$ generation (5G) network or other networks that use transmission frequencies higher than 2 GHz.

In some cases, system information may be divided into broadcast and on-demand system information. The broadcast system information includes the system information that may be used for a UE to perform initial access. This broadcast system information is broadcasted periodically by the network. In some cases, the broadcast system information can be referred to as the minimum system information. Examples of the broadcast SI include parameters such as random access channel (RACH) configuration, public land mobile network (PLMN) information, cell identity (ID) information, information related to the periodicity of any broadcast system information, and information related to other system information that is provided on-demand. The on-demand system information may include system information such as cell reselection parameters, multimedia broadcast multicast service (MBMS) configuration, system information related to services such as direct device to device communications and wireless local area network (WLAN) offload service etc. In some cases, the on-demand system information may include system information that has a large volume, e.g., exceeding a predetermined number of bytes. In some cases, the on-demand system information can be referred to as other system information. For LTE, the information included by the MIB and SIB1 may be included in the broadcast system information and the information in other SIBs may be included in the on-demand system information. In some cases, the broadcast SI can be transmitted using a broadcast channel. The on-demand SI can be transmitted to a UE in response to a request from the UE.

In some cases, system information in downlink is available (e.g., unencrypted) for any UE. Hence, any UE can obtain the broadcast system information and request on-demand system information. An SI request may originate from a genuine UE attempting to access the cell or attempting to camp on the cell for obtaining idle mode services such as MBMS, etc. On the other hand, a malicious UE may also transmit SI requests. Further, a UE in idle mode can request parts of system information. However, a base station that transmits the SI does not have the context (e.g. the UE ID) for a UE in an idle mode. Thus the base station does not have security context for the idle mode UE and cannot verify if the UE requesting on-demand SI is a genuine or malicious UE. Therefore, a network may be subject to denial of service (DoS) attacks from malicious UEs launching voluminous requests for on-demand SI, in particular for SI that is very large and would occupy large amount of radio sources.

In some cases, an authentication process can be performed to determine whether the on-demand SI should be transmitted to the UE that requests the on-demand SI thereby obviating or minimizing the effects of DoS attacks by malicious UEs. The authentication process can be based on a challenge vector, and a response vector generated using the challenge vector and a key shared between the UE and a peer network node. The challenge vector can be generated by the UE or a network node, e.g., a base station or a core network node. In some cases, whether the authentication process is needed for the SI request can be determined based on the state of the UE, the congestion status of the network, the size or type of the requested SI or any other factors. FIGS. 1-18 and associated descriptions provide additional details of these implementations.

FIG. 1 is an example wireless communication system 100 according to an implementation. The example wireless communication system 100 includes a radio access network (RAN) 110, a core network 120, and the Internet 130.

A RAN, e.g., the RAN 110, is part of a wireless telecommunication system which implements a radio access technology (RAT), such as long term evolution (LTE), LTE-Advanced (LTE-A), 5G RAT, Global System for Mobile communication (GSM), General Packet Radio Service (GPRS), Enhanced Data rates for GSM Evolution (EDGE), Interim Standard 95 (IS-95), Code Division Multiple Access (CDMA) 2000, Evolution-Data Optimized (EVDO), or Universal Mobile Telecommunications System (UMTS). In many applications, a RAN includes at least one base station, e.g., the base station 104. A base station may be a radio base station that may control all or at least some radio-related functions in a fixed part of the system. The base station may provide radio interface within their coverage area or a cell for a mobile device to communicate. The base station or base stations may be distributed throughout the cellular network to provide a wide area of coverage. The base station directly communicates to one or a plurality of mobile devices, other base stations, and one or more core network nodes. The base station may be a NodeB, an evolved NodeB (eNB), a next generation (i.e., 5G) NodeB, or an access point. The base station may further comprise a control unit connected to the core network or other radio network nodes and one or more distributed units providing radio coverage connected to the control unit.

The RAN 110 also includes a UE 102 that communicates with the base station 104. A UE, e.g., the UE 102, may include, without limitation, any of the following: computing device, mobile device, mobile electronic device, user device, mobile station, subscriber station, portable electronic device, mobile communications device, wireless modem, wireless terminal, a mobile unit in a vehicle, a mobile device including a Universal Subscriber Identity Module (USIM) or Universal Integrated Circuit Card (UICC). Examples of a UE may include a cellular phone, personal data assistant (PDA), smart phone, laptop, tablet, personal computer (PC), pager, portable computer, portable gaming device, wearable electronic device, health/medical/fitness device, camera, or other mobile communications devices having components for communicating voice or data, via a wireless communication network. The wireless communication network may include a wireless link over at least one of a licensed spectrum and an unlicensed spectrum. The term "UE" can also refer to any hardware or software component that can terminate a communication session for a user. In addition, the terms "user equipment," "UE," "user equipment device," "user agent," "UA," "user device," and "mobile device" can be used synonymously herein.

The core network 120 includes one or more core network (CN) nodes that provide core network service to the wireless communication system 100. The core network 120 can provide communication channels between the RAN 110 and the Internet 130. The core network 120 includes a mobility management entity (MME) 124, a gateway 126, and a home subscriber server (HSS) 122. The MME 124 includes an application, set of applications, software, software modules, hardware, or combination thereof that can be configured to provide mobility management functions for the core network 120. In some cases, the MME 124 can perform one or more functions including idle mode UE paging, bearer activation/deactivation process, attach process, ciphering/integrity protection for non access-stratum (NAS) signaling, control plane function for mobility between the RATs, and the like. The MME 124 can hold non access-stratum (NAS) context for a UE in an attached state. The NAS context includes a NAS security context for the UE.

The gateway 126 includes an application, set of applications, software, software modules, hardware, or combination thereof that can be configured to provide user plane functions for the core network 120. In some cases, the gateway 126 can include one or more serving getaway (SGW), Packet Data Network (PDN) gateway (PWG), or a combination thereof. The HSS 122 includes an application, set of applications, software, software modules, hardware, or combination thereof that can be configured to provide subscription information for the core network 120. The HSS 122 can include a database that stores user-related and subscription-related information. The HSS 122 provides functionalities such as mobility management, call and session establishment support, user authentication and access authorization. In some cases, the HSS 122 can include one or more Home Location Register (HLR), Authentication Center (AuC) or a combination thereof.

In one example, the UE 102 can transmit a request for on-demand SI to the base station 104. The base station 104 can determine whether authentication is needed. If the authentication is needed, the base station 104 can generate a challenge vector and transmits the challenge vector to the UE 102. The UE 102 can generate a response vector based the challenge vector and transmits the response vector to the base station 104. The base station can communicate with a CN node, e.g., the MME 124, the HSS 122, or a combination thereof to verify the response vector. If the verification succeeds, the base station 104 can transmit the requested SI to the UE 102. If the verification fails, the base station 104 can discard the request and refrain from transmitting the requested on-demand SI. In other examples, the challenge vector can be generated at the UE 102. Whether the authentication process is needed for SI request can be implicitly or explicitly indicated to the UE 102. The SI request, the challenge vector, the response vector, or any combinations thereof can be transmitted in physical random access channel (PRACH) preamble to a message subsequent to the PRACH preamble. FIGS. 2-18 and associated descriptions provide additional details of these implementations.

While elements of FIG. 1 are shown as including various component parts, portions or modules that implement the various features and functionality, nevertheless these elements may instead include a number of sub-modules, third-party services, components, libraries, and such, as appropriate. Furthermore, the features and functionality of various components can be combined into fewer components, as appropriate.

Figure 2:
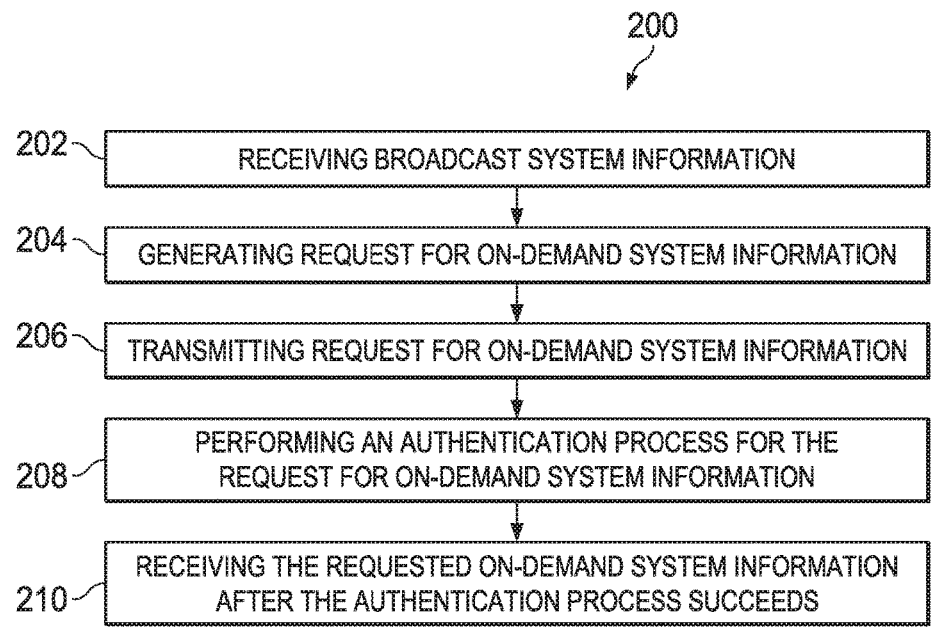
FIG. 2 is an example flow diagram illustrating an authentication process for requesting on-demand system information according to an implementation.

FIG. 2 is an example block diagram 200 illustrating an authentication process for requesting on-demand system information according to an implementation. At block 202, the UE receives broadcast system information from a base station. The broadcast system information can include one or more indications indicating whether authentication for SI request is needed, information related to generating a challenge vector, or any combination thereof. At block 204, the UE generates a request for on-demand SI. At block 206, the UE transmits the request for on-demand SI. At block 208, an authentication process is performed for the on-demand SI request. In some cases, the authentication process is performed in response to a determination that the authentication process in needed. The determination can be made based on the state of the UE, the congestion status of the network, the size or type of the requested SI, any other factors, or any combinations thereof. At block 210, the UE receives the requested SI after the authentication process succeeds. FIGS. 2-18 and associated descriptions provide additional details of these implementations. Furthermore, the process shown in FIG. 2 can also be implemented using additional, fewer, or different operations, which can be performed in the order shown or in a different order.

Figure 3:
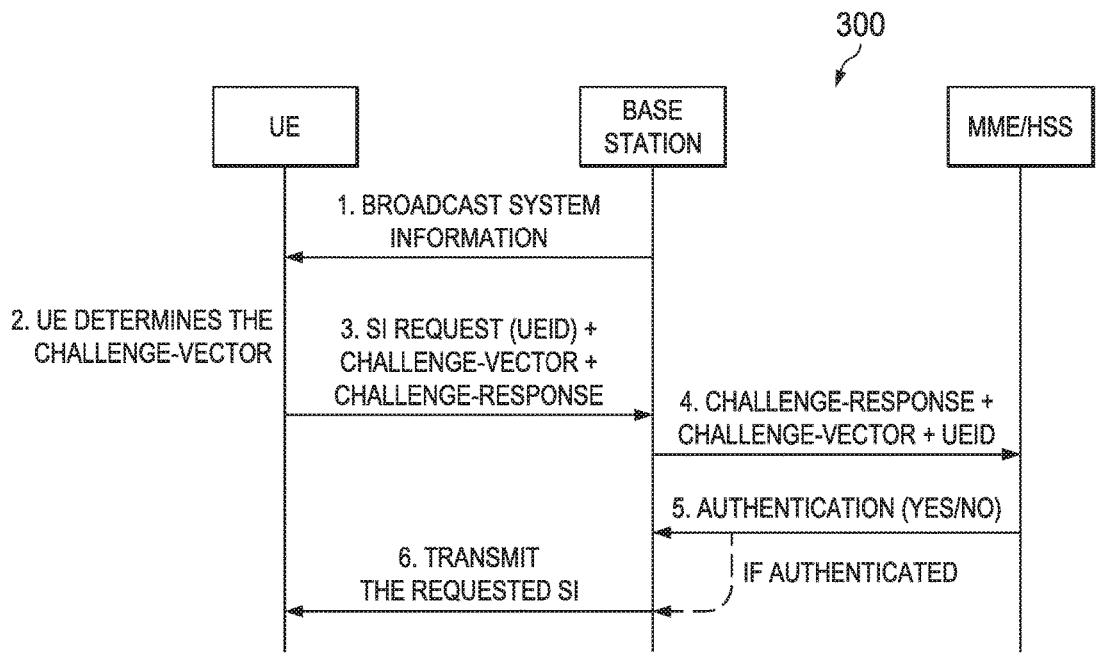
FIG. 3 is an example flow diagram illustrating an authentication process for requesting on-demand system information based on a challenge vector generated by the UE according to an implementation.

The challenge vector can be generated in a UE, a base station, or a core network node such as an MME or a HSS. FIG. 3 is an example flow diagram 300 illustrating an authentication process for requesting on-demand system information based on a challenge vector generated by the UE according to an implementation. At step 1, the base station transmits broadcast SI using a broadcast channel and the UE receives the broadcast SI. At step 2, the UE generates a challenge vector. The UE also generates a response vector based on the challenge vector. At step 3, the UE transmits a request for on-demand SI. The request can include an indication of the UE ID, the challenge vector, the response vector, or any combinations thereof. At step 4, the base station transmits the UE ID, the challenge vector, the response vector, or any combinations thereof, to a core network node, e.g., to the MME or to the HSS via MME. The core network node can perform an authentication process based on the UE ID, the challenge vector, the response vector, or any combinations thereof. At step 5, the core network node can transmit the authentication response to the base station. The authentication response indicates whether the authentication is successful. If the authentication is successful, at step 6, the base station transmits the requested SI to the UE. If the authentication is not successful, the base station can refrain from transmitting the requested SI. In some cases, the signaling between the base station and one or more core network nodes can be transmitted using Non-Access Stratum (NAS) signaling.

Figure 4:
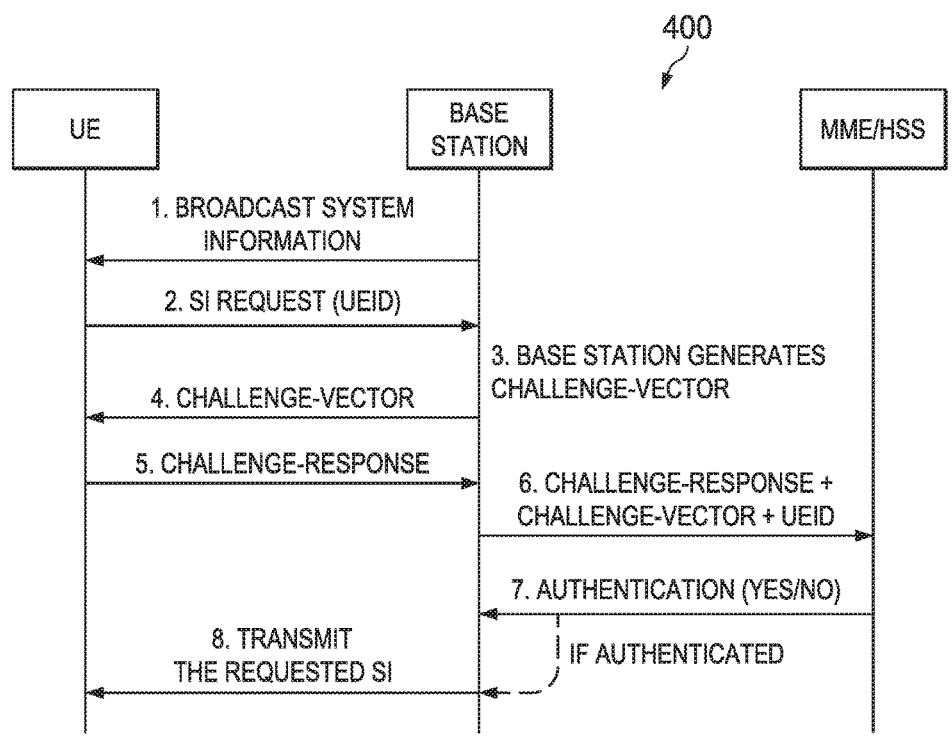
FIG. 4 is an example flow diagram illustrating an authentication process for requesting on-demand system information based on a challenge vector generated by the base station according to an implementation.

FIG. 4 is an example flow diagram 400 illustrating an authentication process for requesting on-demand system information based on a challenge vector generated by the base station according to an implementation. At step 1, the base station transmits the broadcast SI using a broadcast channel and the UE receives the broadcast SI. At step 2, the UE transmits a request for on-demand SI. The request may include an indication of the UE ID. At step 3, the base station generates a challenge vector. At step 4, the base station transmits the challenge vector to the UE. The UE, after receiving the challenge vector from the base station, generates a response vector based on the challenge vector. At step 5, the UE transmits the response vector to the base station. This message that includes the response vector may also include UE ID if this is not included in step 2. At steps 6-8, the base station communicates with the core network node to authenticate the request, and transmits the requested on-demand SI if the authentication is successful.

Figure 5:
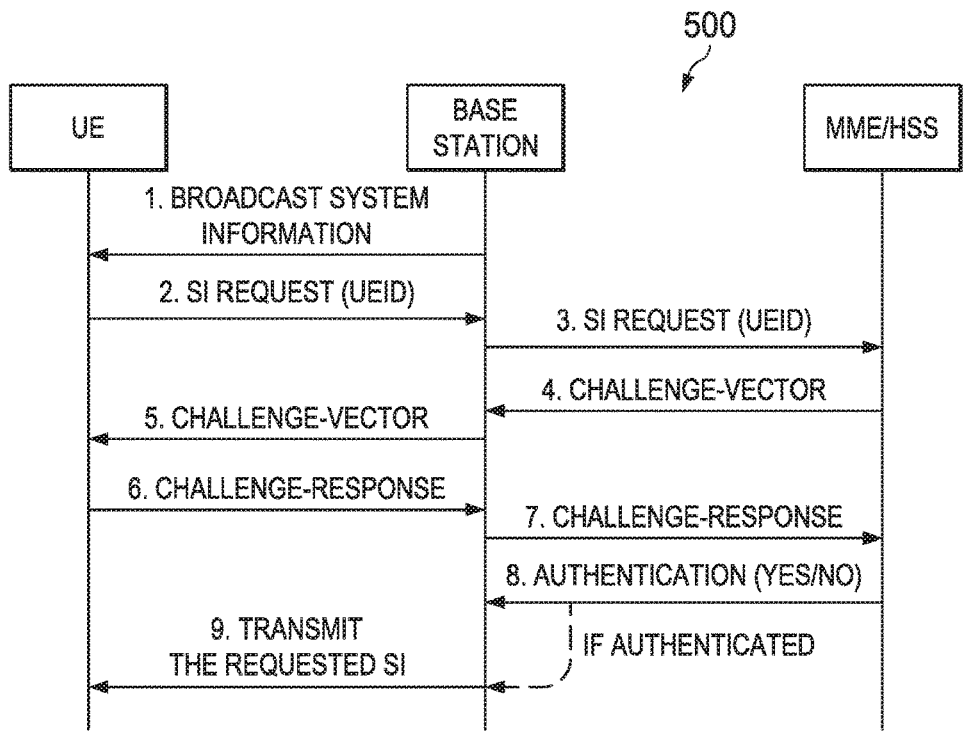
FIG. 5 is an example flow diagram illustrating an authentication process for requesting on-demand system information based on a challenge vector generated by a core network node according to an implementation.

FIG. 5 is an example flow diagram 500 illustrating an authentication process for requesting on-demand system information based on a challenge vector generated by a core network node according to an implementation. At step 1, the base station transmits broadcast SI using a broadcast channel and the UE receives the broadcast SI. At step 2, the UE transmits a request for on-demand SI. The request may include the UE ID. At step 3, the base station sends the request to the core network node. The request can include the UE ID. The core network node generates a challenge vector. At step 4, the core network node transmits the challenge vector to the base station. At step 5, the base station transmits the challenge vector the UE. The UE, after receiving the challenge vector from the base station, generates a response vector based on the challenge vector. At step 6, the UE transmits the response vector to the base station. At step 7, the base station transmits the response vector to the core network node. At steps 8-9, the core network node authenticates the request, and the base station transmits the requested on-demand SI to the UE if the authentication is successful.

The challenge vector can include a randomly generated number (RAND). In some cases, the RAND may be generated using a secure keyed-hash function. For example, the UE can use the f1 function specified in $3^{rd}$ generation partnership project (3GPP) TS 35.909 to generate the RAND, and the base station or the core network node can use the f0 function specified in 3rd generation partnership project (3GPP) TS 35.909 to generate the RAND. The hash function can take the UE ID as an input. The UE ID can be one of the International Mobile Subscriber Identity (IMSI), Temporary Mobile Subscriber Identity (TMSI), MME Temporary Mobile Subscriber Identity (M-TMSI), Globally Unique Temporary ID (GUTI), Packet Temporary Mobile Identity (P-TMSI), Radio Network Temporary Identity (RNTI), or any combinations thereof. In some cases, the secure keyed-hash function can employ or use a time varying parameter as an input. The time varying parameter can be derived based on a system time or information in the broadcast SI. For example, the time varying parameter can be derived based on a parameter or a system included in the broadcast SI. or a system frame number associated with the broadcast SI.

In some cases, the challenge-response verification described previously can be performed based on a symmetric key based security protocol. The security credentials, e.g., a secret master key K can be stored in a core network node, e.g., the HSS, and the UE, e.g., in a universal subscriber identity module (USIM) of the UE. Authentication can be performed using a challenge-response mechanism based on this shared key K or a key derived from this shared key. In some cases, the challenge-response may be generated within the USIM of the UE.

In some cases, the response vector can be generated based on the challenge vector using a cryptographic keyed-hash function, e.g., f1-f5 functions specified in 3GPP TS 35.909. The cryptographic keyed-hash function can employ or use the RAND in the challenge vector and a shared key as an input to generate the response vector. The UE can generate the response vector and transmit to the base station. The base station or the core network node can also generate a response vector using the RAND and the shared key. The generated response vector can be compared with the received response vector from the UE. If they match, the authentication succeeds; if they fail to match, the authentication fails.

In some cases, the UE, the base station, and a core network node can hold one or more shared keys derived from the master key K depending on the state of the UE. For example, if the UE is in a connected state, the UE has established both AS (access-stratum) and NAS security contexts. In these cases, the UE has generated and has access to the master key K, derived keys for NAS, e.g., K_asme, K_NASint, K_NASenc, and derived keys for AS, e.g., K_RRCenc, K_RRCint, K_UPenc. The base station has the AS security context for the UE, including e.g., K_RRCenc, K_RRCint, K_UPenc). The MME has the NAS security context for the UE, including, e.g., K_asme, K_NASint, K_NASenc. The HSS has the master key K. If the UE is in the attached state, the UE has established NAS security context and thus both the UE and the MME may hold derived keys for NAS. In this case, the UE has not established AS security context, and thus neither the UE nor the base station holds derived keys for AS. The UE, the base station, and the core network nodes can hold one or more other shared keys.

Figure 10:
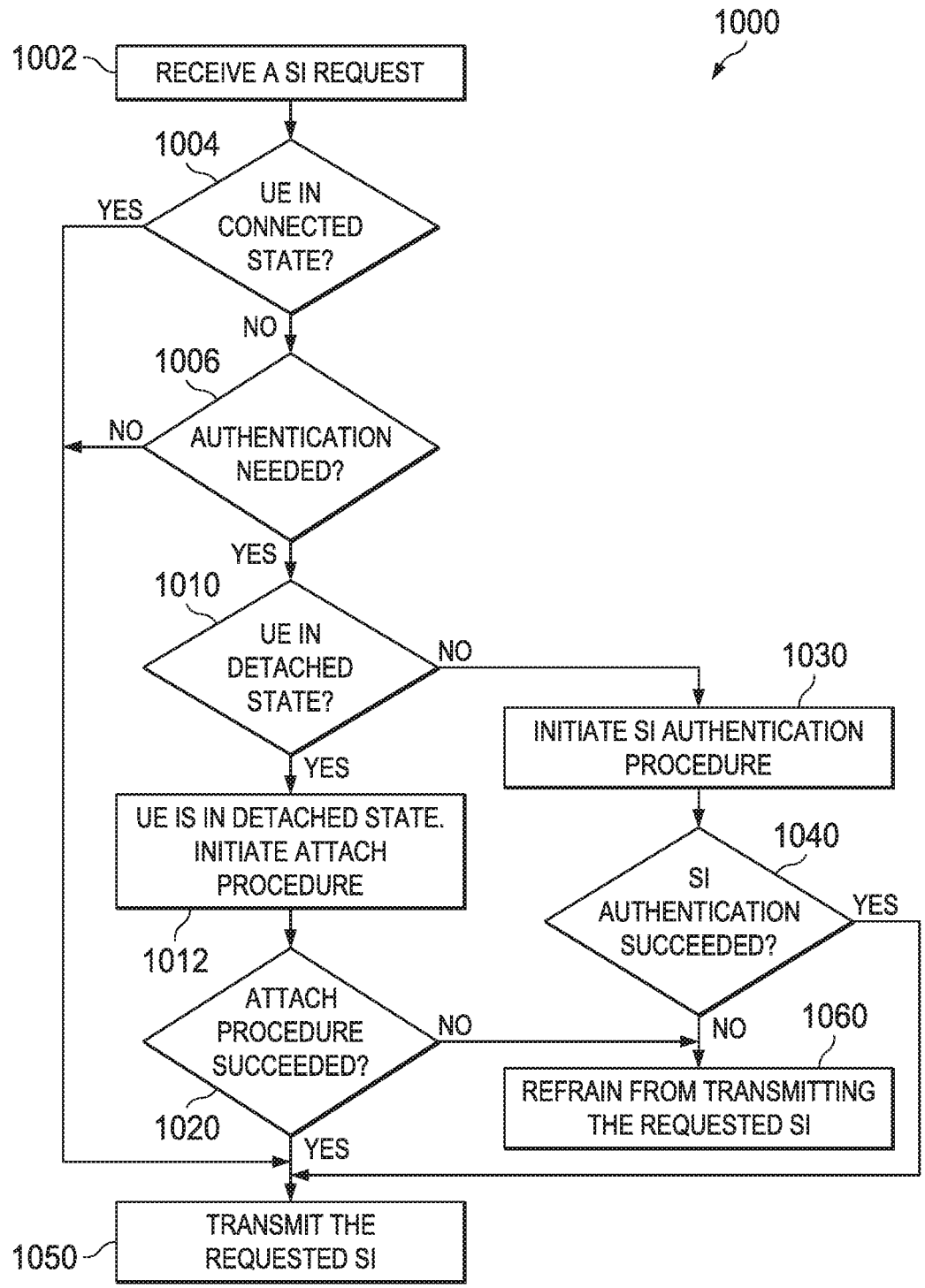
FIG. 10 is an example block diagram illustrating a process for determining authentication for system information requests based on the state of UE according to an implementation.

In some cases, the network node that performs the challenge-response verification can be selected based on the state of the UE and based on the keys shared between the UE and the network nodes. For example, if the UE is in connected state, the AS keys can be used to generate the response vector, and therefore the base station can perform the verification without signaling to the core network nodes. Alternatively, if the UE is in connected state, the authentication can be skipped. FIG. 10 and associated descriptions provide additional details of these implementations.

If the UE is in attached state, the NAS keys can be used to generate the response vector, and therefore the MME can perform the verification. If the UE is in a detached state, the shared master key can be used to generate the response vector, and therefore the HSS can perform the verification. Alternatively, if the UE is in detached state, the UE can be requested to perform an attach process before the requested SI is transmitted. FIG. 10 and associated descriptions provide additional details of these implementations.

Figure 11:
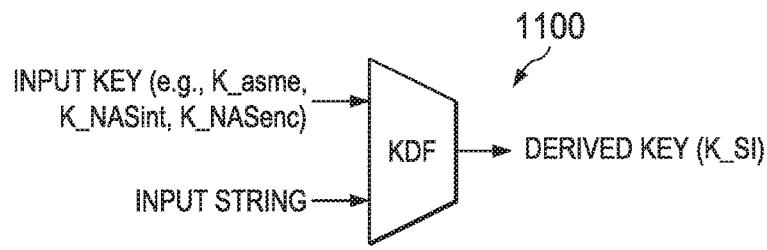
FIG. 11 is an example schematic diagram illustrating deriving an authentication key for SI request according to an implementation.

In some cases, instead of using the shared keys directly to generate the response vector, an authentication key for SI request can be derived. FIG. 11 is an example schematic diagram 1100 illustrating deriving an authentication key for SI request according to an implementation. As illustrated, a key derivation function (KDF) can take the inputs of a shared key, e.g., one or more NAS keys, and an input string to generate an authentication key for SI request. The authentication key for SI request can then be used with the RAND to generate the response vector. The input string can be a random string, commonly referred to as a salt.

In some cases, the base station can determine whether the security context that is used to verify the response vector based on the challenge vector is available in the base station. As illustrated in FIGS. 3-5, if the security context is not available at the base station, e.g., for the UE in the idle mode, the base station can transmit the challenge vector to the core network node, e.g., MME or HHS, that holds the security context to perform the verification. Other network nodes can also be used to perform the verification. Alternatively, if the security context is available at the base station, e.g., for the UE in the connected mode, the base station can verify the response vector without transmitting the response vector to the core network node.

Figure 6:
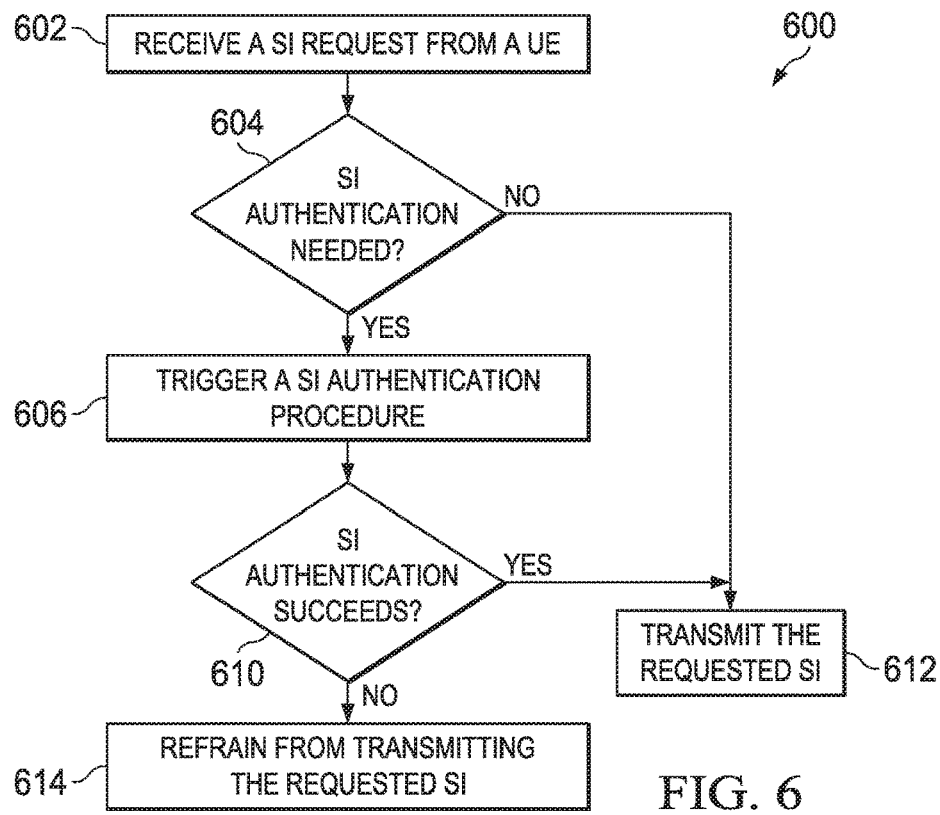
FIG. 6 is an example block diagram illustrating an authentication determination process for requesting on-demand system information according to an implementation.

In some cases, whether authentication is needed for the on-demand SI request can be determined based on one or more factors. FIG. 6 is an example block diagram 600 illustrating an authentication determination process related to requesting on-demand system information according to an implementation. At block 602, a base station receives a request for on-demand SI. At block 604, the base station determines whether authentication is needed for providing the requested on-demand SI. Following are example factors that can be taken into consideration for this determination:

1) Load on Radio Access Network:

Authentication for on-demand SI may be triggered if the radio access network is congested. If there are enough radio resources, the base station may determine not to trigger the authentication process and instead transmits the requested SI without authentication. On the other hand, if the radio access network is congested, then the base station may determine that authentication is needed.

2) Load on Core Network Interfaces:

Authentication for on-demand SI may be triggered if the core network interface is congested. If the base station determines that security context is not available in the base station and therefore signaling between the base station and the core network node that performs the verification is needed, and the capacity on the interface between the base station and the core network node is congested, the base station may determine not to trigger the authentication process and instead transmits the requested SI without authentication. Otherwise, the base station may determine that authentication is needed.

3) UE State:

In some cases, if the UE is in a connected state, the base station may determine that authentication for the on-demand SI request may not be needed. If the UE is not in the connected state, the base station may determine that authentication is needed. Further, if the UE is in detached state, an authentication for SI request may not be needed. Instead the authentication process may be executed during the attach process, and may be relied upon to implicitly authenticate the UE for SI requests. FIG. 10 and associated descriptions provide additional details of these implementations.

4) Size and Type of the Requested SI:

Transmitting larger SI incurs more overhead over the air interface. Hence, the base station may choose to initiate an authentication process for requests of SI whose size meets or exceeds a configured threshold. Alternatively or additionally, the base station may determine to skip the authentication process based on the type of SI. For example, the base station may transmit on-demand SI that is time sensitive, e.g., SIBs carrying information about local incidents such as public warning system information such as earthquakes or tsunami warnings, without authentication.

5) Interference Conditions in the Network:

Because transmission in a given cell can increase interference to another user or another cell, the base station may determine whether to skip the authentication based on the interference level in the cell. The base station can configure one or more interference thresholds for uplink, downlink, or a combination thereof. If the interference meets or exceeds the threshold, the authentication can be required. If the interference is below the threshold, the on-demand SI can be provided without authentication.

6) Latency Requirements Associated with the Requested SI:

Certain SI are time sensitive whilst others may not be time sensitive. An example of time sensitive SI is a SI including information about any local emergency—such as earthquake and tsunami warnings etc. If a SI request is for time sensitive SI, the base station may transmit the SI without authentication. On the other hand if the SI request is for non-time sensitive SI then an authentication process may be invoked for the SI request.

In some cases, one or more factors can be combined in making the decision. For example, if neither the RAN nor the CN is congested, the authentication can be skipped. If the RAN is congested and the CN is not congested, the authentication can be invoked. If the RAN is not congested and the CN is congested, the authentication can be skipped. If both the RAN and the CN are congested, the authentication can be invoked based on additional criteria, e.g., the size of the requested SI.

If the base station determines that authentication is not needed, at block 612, the base station transmits the requested SI. If the base station determines that authentication is needed, at block 606, the authentication process is triggered, e.g., by requesting a response vector from the UE. At block 610, whether the authentication is successful is determined. If the authentication succeeds, at block 612, the base station transmits the requested SI. If the authentication fails, at block 614, the base station refrains from transmitting the requested SI. This approach can provide flexibility in balancing security and capacity considerations.

Figure 7:
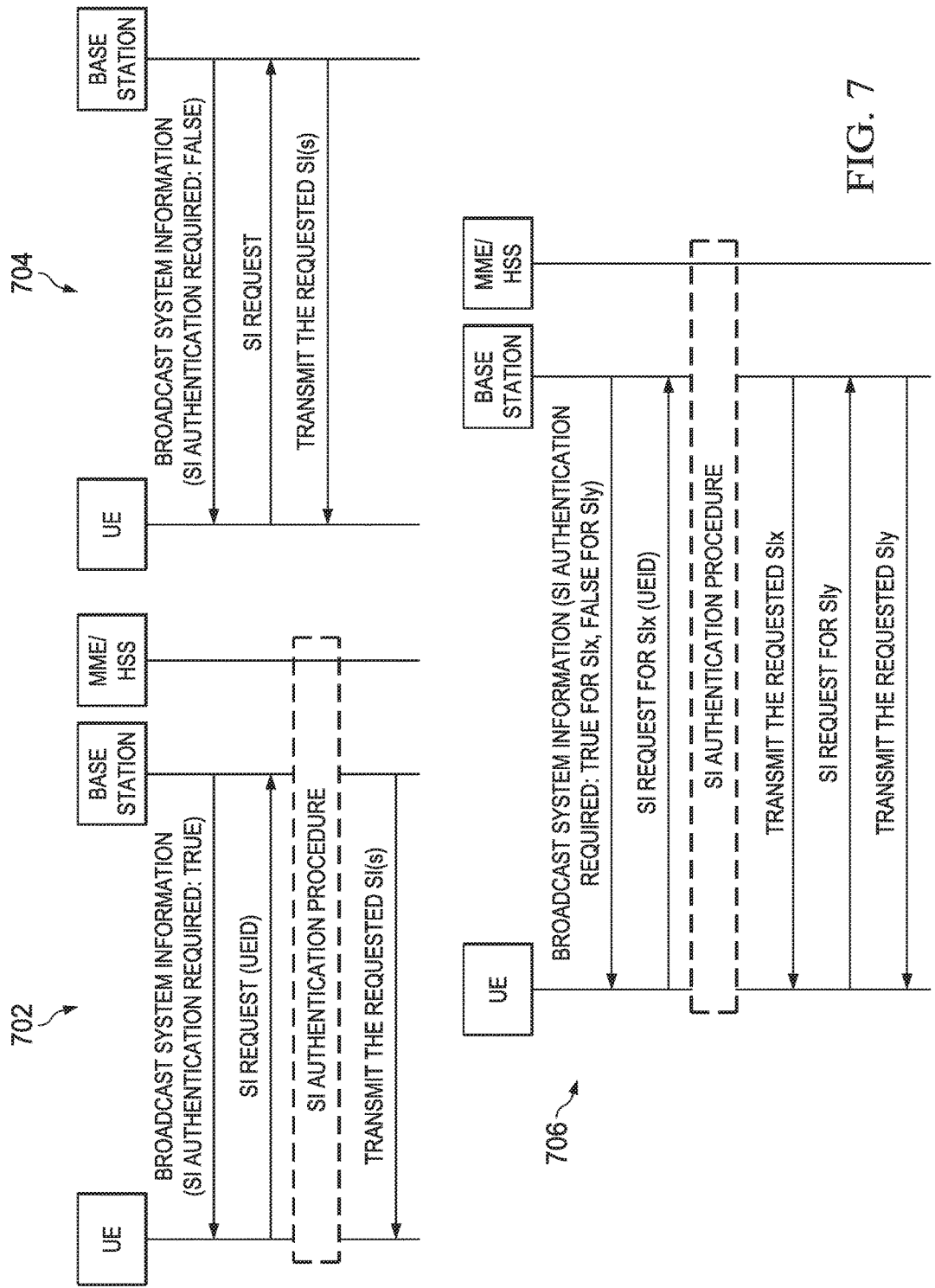
FIG. 7 includes example flow diagrams that illustrate explicit indications for authenticating system information requests according to various implementations.

In some cases, the decision of whether the authentication is needed for on-demand SI can be explicitly indicated. FIG. 7 includes example flow diagrams 702, 704, and 706 that illustrate explicit indications for authenticating system information requests according to various implementations. For example, the base station can include an indication in the broadcast system information. The indication can indicate whether authentication is required for on-demand SI requests. As illustrated in 702, if the indication indicates that authentication is needed, the authentication process described previously can be performed. If, as illustrated in 704, the indication indicates that authentication is not needed, the authentication process can be skipped. In these or other cases, the UE can transmit the request for on-demand SI without providing a response vector, and the base station can transmit the requested on-demand SI to the UE in response to the request. In some cases, as illustrated in 706, the indication can indicate that authentication is needed for some SI but not for others.

Figure 8:
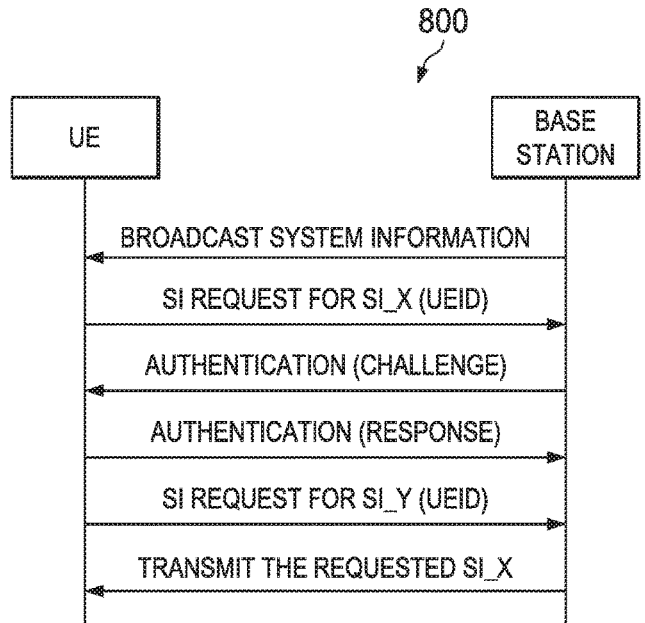
FIG. 8 is an example flow diagram illustrating an implicit indication for authenticating system information requests according to an implementation.

In some cases, the decision of whether the authentication is needed for on-demand SI can be implicitly indicated. FIG. 8 is an example flow diagram 800 illustrating an implicit indication for authenticating system information requests according to an implementation. As shown in FIG. 8, the broadcast SI may not include the indication that explicitly indicates whether authentication is needed for on-demand SI. The UE may send the request for on-demand SI. If the base station determines that authentication in needed, as shown for SI_X, the base station can transmit an authentication request. If the challenge vector is generated at the base station or a core network node, the authentication can include the challenge. The UE can transmit the response vector in the authentication response. If the challenge vector is generated at the UE, the authentication response can also include the challenge vector. If the base station determines that authentication is not needed, as shown for SI_Y, the base station can transmit the requested on-demand SI without the authentication request.

Figure 9:
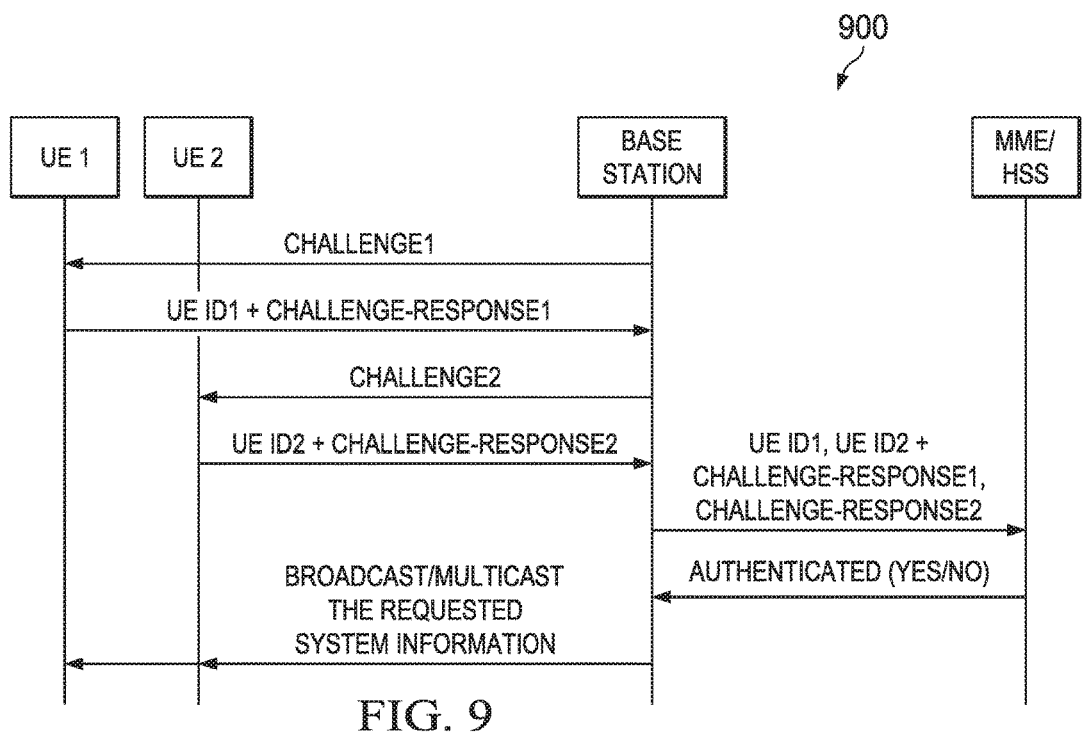
FIG. 9 is an example flow diagram illustrating a process for collating authentication messages according to an implementation.

In some cases, the signaling between the base station and the core network node can be collated or otherwise aggregated, combined or batched. FIG. 9 is an example flow diagram 900 illustrating a process for collating authentication messages according to an implementation. As illustrated, the base station can combine authentication information for more than one UEs to the core network node to perform authentication. In some cases, the core network node can provide a combined response. The combined response can indicate that the authentication fails if the request from at least one UEs fails authentication. Alternatively, the core network can provide a response that indicates whether the request from each individual UE fails authentication. If requests from more than one UEs pass authentication, the base station can transmit the requested SI using a broadcast channel or a multicast channel that can be received by the UEs that pass authentication. Alternatively or additionally, the base station can transmit the requested SI using a unicast channel. In some cases, the base station may collate the SI requests from a plurality of UEs and may transmit the requested SI after a predetermined number of UEs have requested the specific SI. This specific SI may be transmitted with or without invoking SI authentication for individual SI requests. In some cases, the base station may adopt mechanisms to reduce the transmission of SI messages by limiting the number of SI requests to which the base station will respond to within a given period of time. This limit may for instance include an upper limit on periodicity of transmission of any on-demand system information.

In some cases, whether the authentication is needed can be determined based on the state of the UE. FIG. 10 is an example block diagram 1000 illustrating a process for determining authentication for system information requests based on the state of UE according to an implementation. At block 1002, a base station receives the SI request. At block 1004, the base station determines if the UE is in connected state. If the UE is connected state, at block 1050, the base station transmits the requested SI without authentication. In some cases, because the UE is in connected state, both the UE and eNB have AS security context, and the SI can be transmitted using a secured channel and thus the authentication for SI request can be skipped.

If the UE is not in connected state, at block 1006, the base station determines if the authentication is needed. The base station can determine whether authentication is needed based on the one or more factors described previously. If the base station determines that authentication is not needed, at block 1050, the base station transmits the requested SI without authentication. If the base station determines that authentication is needed, at block 1010, the base station determines whether the UE is in detached state. If the UE is in a detached state, at block 1012, the attach process is initiated. At block 1020, the base station determines whether the attach process is successful. If the attach process is determined at block 1020 to be successful, at block 1050, the base station can transmit the requested SI. If the attach process is not successful, at block 1060, the base station refrains from transmitting the requested SI to the UE.

If at block 1010, the UE is determined to be in an attached state (i.e., not in a detached state), at block 1030, the authentication process for SI request is initiated. At block 1040, the base station determines whether the authentication process is successful. If at block 1040 the authentication process is determined to be successful, at block 1050, the base station can transmit the requested SI. If the authentication process is not successful, at block 1060, the base station refrains from transmitting the requested SI to the UE.

Figure 12:
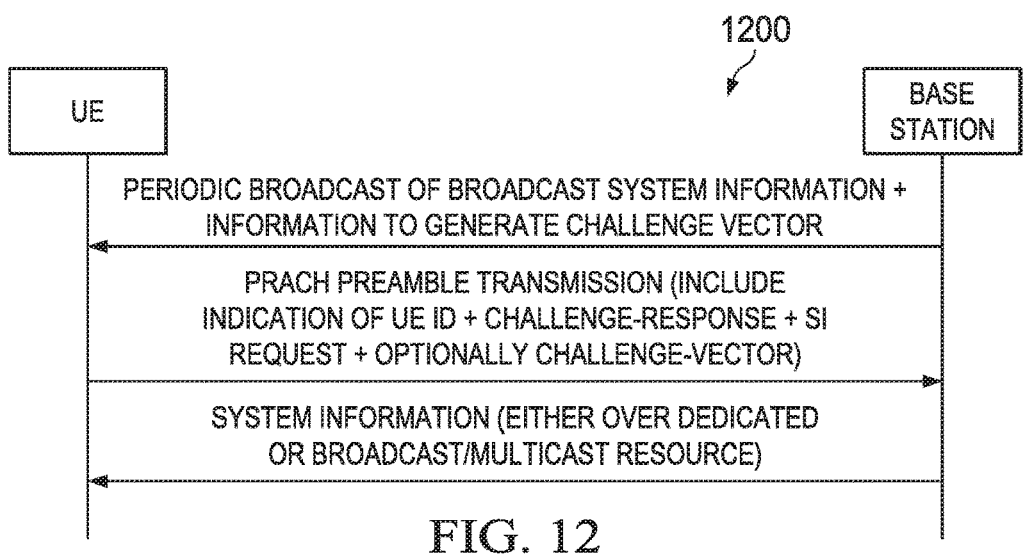
FIG. 12 is an example flow diagram illustrating a process for transmitting the response vector in the PRACH preamble according to an implementation.

In some cases, the challenge vector, the response vector, or a combination thereof can be transmitted using the physical random access channel (PRACH) preamble transmission or a subsequent transmission. FIG. 12 is an example flow diagram 1200 illustrating a process for transmitting the response vector in the PRACH preamble according to an implementation. As shown in FIG. 12, the base station periodically transmits broadcast system information. The broadcast system information can include indication that SI request authentication is needed, information to generate a challenge vector, or a combination thereof. The UE can include the SI request, the UE ID, the response vector, and optionally the challenge vector in the PRACH. The base station can transmit the system information if the authentication is successful. This approach reduces the authentication time for acquiring the SI.

Figure 13:
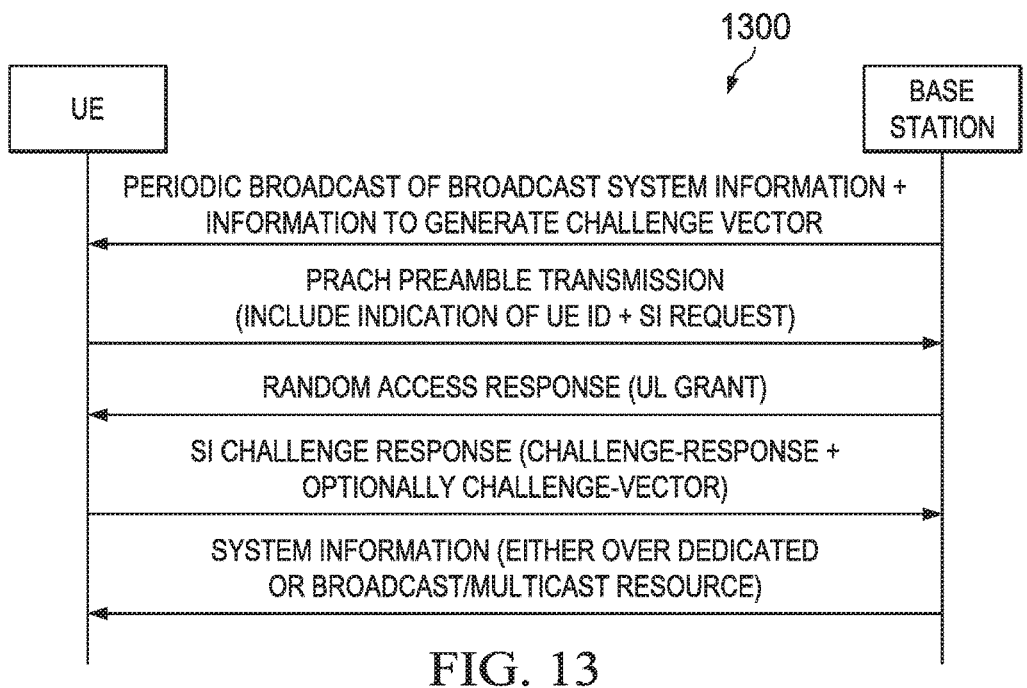
FIG. 13 is an example flow diagram illustrating a process for transmitting the response vector in a message subsequent to the PRACH preamble according to an implementation.

FIG. 13 is an example flow diagram 1300 illustrating a process for transmitting the response vector in a message subsequent to the PRACH preamble according to an implementation. As illustrated, the UE includes the SI request and UE ID in the PRACH preamble. The base station transmits an uplink link (UL) grant in a random access response. The UE can include the response vector and optionally the challenge vector in the UL resources indicated by the UL grant. These challenge and response vectors can be included in an uplink message sent on an UL channel which is indicated by the UL grant. This approach may reduce the load on the PRACH. In response to the SI challenge response being transmitted by the UE on UL resources, the base station transmits SI requested by the UE. The base station may transmit the SI either over a dedicated resource or over a broadcast/multicast resource.

Figure 14:
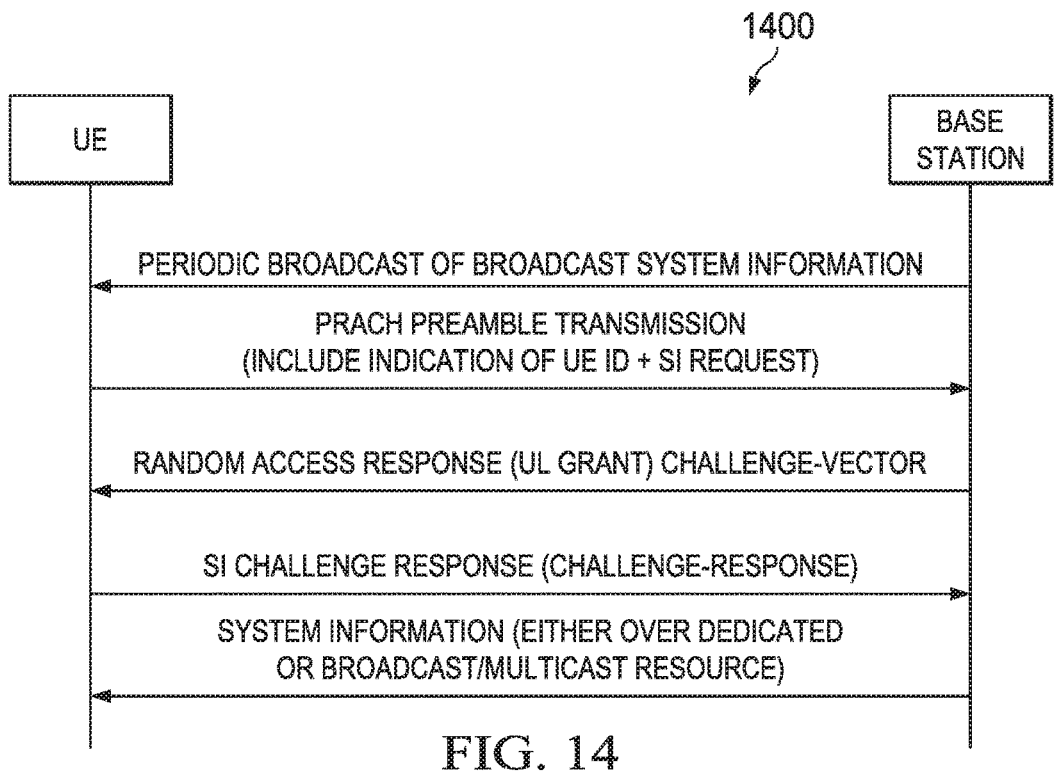
FIG. 14 is an example flow diagram illustrating a different process for transmitting the response vector in a message subsequent to the PRACH preamble according to an implementation.

FIG. 14 is an example flow diagram 1400 illustrating a different process for transmitting the response vector in a message subsequent to the PRACH preamble according to an implementation. In this example, the base station or a core network node generates the challenge vector. As illustrated, the UE includes the SI request and UE ID in the PRACH preamble. The base station transmits an uplink link (UL) grant in a random access response. The base station also includes the challenge vector in the UL grant. The UE generates the response vector and transmits the response vector using the UL resources indicated by the UL grant. In response to the SI challenge response being transmitted by the UE on UL resources, the base station transmits SI requested by the UE. The base station may transmit the SI either over a dedicated resource or over a broadcast/multicast resource.

Figure 15:
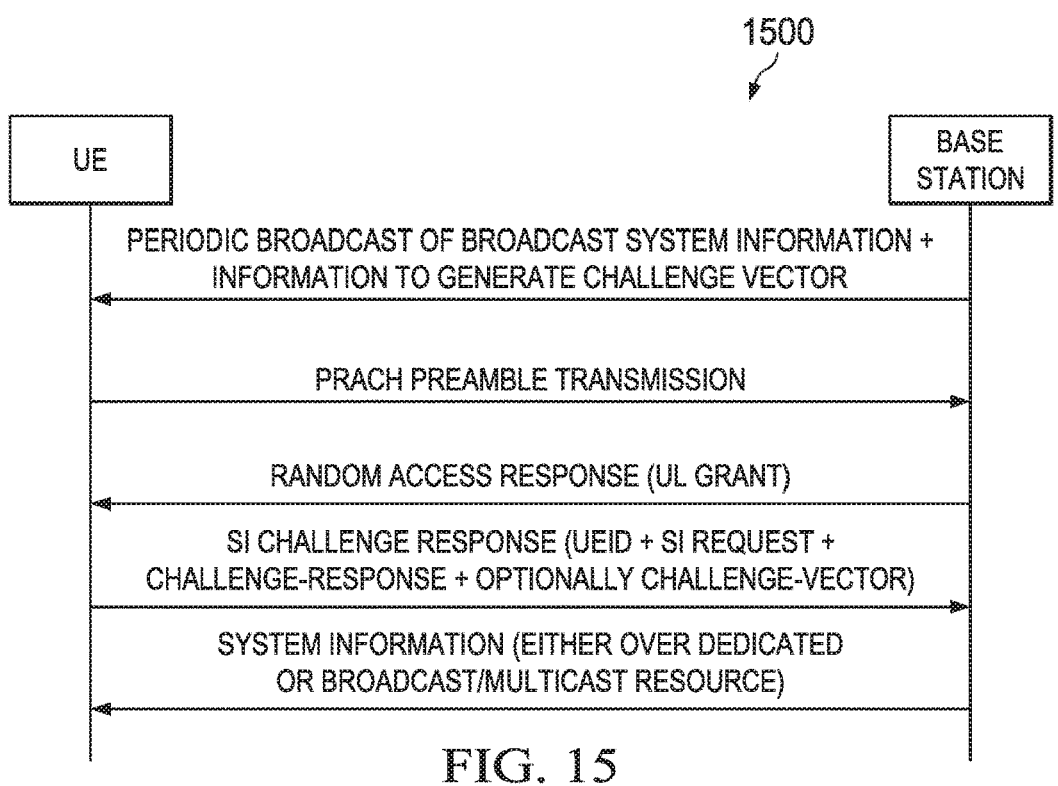
FIG. 15 is an example flow diagram illustrating a process for transmitting the SI request in a message subsequent to the PRACH preamble according to an implementation.

FIG. 15 is an example flow diagram 1500 illustrating a process for transmitting the SI request in a message subsequent to the PRACH preamble according to an implementation. As illustrated, the UE transmits the PRACH preamble without the SI request. The base station transmits an uplink link (UL) grant in a random access response. The UE can transmit the SI request and UE ID using the UL resources indicated by the UL grant. The UE can also transmit the challenge vector, the response vector, or a combination thereof with the SI request and UE ID. This approach may further reduce the load on the PRACH. In response to the UL grant the UE transmits the UE ID, challenge response, and optionally challenge vector on UL resources. In response to the UE ID, challenge response and optionally the challenge vector, the base station transmits SI requested by the UE. The base station may transmit the SI either over a dedicated resource or over a broadcast/multicast resource.

FIG. 16 is an example flow diagram 1600 illustrating a different process for transmitting the SI request in a message subsequent to the PRACH preamble according to an implementation. As illustrated, the UE transmits the PRACH preamble without the SI request. The base station transmits an uplink link (UL) grant in a random access response. The UE can transmit the SI request and UE ID using the UL resources indicated by the UL grant. In this example, the base station or a core network node generates the challenge vector. The base station transmits the challenge vector to the UE. The UE generates the response vector and transmits the response vector to the base station. In response to the SI challenge response being transmitted by the UE on UL resources, the base station transmits SI requested by the UE. The base station may transmit the SI either over a dedicated resource or over a broadcast/multicast resource.

FIG. 17 is a block diagram illustrating an example user equipment (UE) device 1700. The illustrated device 1700 includes a processing unit 1702, a computer-readable storage medium 1704 (for example, ROM or flash memory), a wireless communication subsystem 1706, a user interface 1708, and an I/O interface 1710.

The processing unit 1702 can include one or more processing components (alternatively referred to as "processors" or "central processing units" (CPUs)) configured to execute instructions related to one or more of the processes, steps, or actions described herein in connection with one or more of the implementations disclosed herein. In some implementations, the processing unit 1702 may be configured to generate control information, such as a measurement report, or respond to received information, such as control information from a network node. The processing unit 1702 may also be configured to make a Radio Resource Management (RRM) decision such as cell selection/reselection information or trigger a measurement report. The processing unit 1702 can also include other auxiliary components, such as random access memory (RAM) and read-only memory (ROM). The computer-readable storage medium 1704 can store an operating system (OS) of the device 1700 and various other computer-executable instructions, logic or software programs for performing one or more of the processes, steps, or actions described above.

The wireless communication subsystem 1706 may be configured to provide wireless communication for voice, data and/or control information provided by the processing unit 1702. The wireless communication subsystem 1706 can include, for example, one or more antennas, a receiver, a transmitter, a local oscillator, a mixer, and a digital signal processing (DSP) unit. In some implementations, the subsystem 1706 can support multiple input multiple output (MIMO) transmissions. In some implementations, the receiver in the wireless communication subsystem 1706 can be an advance receiver or a baseline receiver. Two receivers can be implemented with identical, similar, or different receiver processing algorithms.

The user interface 1708 can include, for example, one or more of a screen or touch screen (for example, a liquid crystal display (LCD), a light emitting display (LED), an organic light emitting display (OLED), a micro-electromechanical system (MEMS) display), a keyboard or keypad, a trackball, a speaker, and a microphone. The I/O interface 1710 can include, for example, a universal serial bus (USB) interface. Various other components can also be included in the device 1700. A number of embodiments of the invention have been described. Nevertheless, it will be understood that various modifications may be made. Accordingly, other embodiments are within the scope of the following claims.

FIG. 18 is a block diagram illustrating an example base station 1800. The illustrated base station 1800 includes a processing module 1802, a wired communication subsystem 1804, and a wireless communication subsystem 1806. The wireless communication subsystem 1806 can receive data traffic and control traffic from the UE. In some implementations, the wireless communication subsystem 1806 may include a receiver and a transmitter. The wired communication subsystem 1804 can be configured to transmit and receive control information between other access node devices via backhaul connections. The processing module 1802 can include one or more processing components (alternatively referred to as "processors" or "central processing units" (CPUs)) capable of executing instructions related to one or more of the processes, steps, or actions described above, in connection with one or more of the implementations disclosed herein. The processing module 1802 can also include other components, such as computer-readable storage medium, e.g. random access memory (RAM), read-only memory (ROM), secondary storage (for example, a hard disk drive or flash memory). In some implementations, the processing module 1802 may be configured to generate control information or respond to received information such as a measurement report transmitted from a UE. The processing module 1802 may also be configured to make an RRM decision based, at least in part, on the information transmitted from the UE, such as cell selection/reselection information or the measurement report. The processing module 1802 can execute certain instructions and commands to provide wireless or wired communication, using the wired communication subsystem 1804 or a wireless communication subsystem 1806. Various other components can also be included in the base station 1800.

Some of the subject matter and operations described in this disclosure can be implemented in digital electronic circuitry, or in computer software, firmware, or hardware, including the structures described in this disclosure and their structural equivalents, or in combinations of one or more of them. Some of the subject matter described in this disclosure can be implemented as one or more computer programs, i.e., one or more modules of computer program instructions, encoded on a computer storage medium for execution by, or to control the operation of, data-processing apparatus. Alternatively or in addition, the program instructions can be encoded on an artificially generated propagated signal, for example, a machine-generated electrical, optical, or electromagnetic signal that is generated to encode information for transmission to suitable receiver apparatus, for execution by a data processing apparatus. The computer-storage medium can be a machine-readable storage device, a machine-readable storage substrate, a random or serial access memory device, or any combinations of computer-storage mediums.

The terms "data-processing apparatus," "computer," or "electronic computer device" encompass all kinds of apparatus, devices, and machines for processing data, including, by way of example, a programmable processor, a computer, a system on a chip, or multiple ones, or combinations of the foregoing. The apparatus can include special purpose logic circuitry, e.g., an FPGA (field programmable gate array) or an ASIC (application specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure encompasses the use of data processing apparatuses with or without conventional operating systems, for example LINUX, UNIX, WINDOWS, MAC OS, ANDROID, IOS, or any other suitable, conventional operating system.

A computer program, which may also be referred to, or described, as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site, or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

Some of the processes and logic flows described in this disclosure can be performed by one or more programmable processors, executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory, or both. A processor can include by way of example a programmable processor, a computer, a system on a chip, or multiple ones, or combinations of the foregoing. A processor can include special purpose logic circuitry, e.g., an FPGA (field programmable gate array) or an ASIC (application specific integrated circuit).

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices, for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including, by way of example, semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry. In some cases, the computer storage medium can be transitory, non-transitory, or a combination thereof.

To provide for interaction with a user, implementations of the subject matter described in this disclosure can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to, and receiving documents from a device that is used by the user, for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this disclosure can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this disclosure, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system, or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, either hardware or software (or a combination of hardware and software), may interface with each other, or the interface using an application programming interface (API), or a service layer (or a combination of API and service layer). The API may include specifications for routines, data structures, and object classes. The API may be either computer language, independent or dependent, and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this disclosure contains many specific implementation details, these should not be construed as limitations on the scope of any invention or on the scope of what may be claimed, but rather as descriptions of features that may be specific to particular implementations of particular inventions. Certain features that are described in this disclosure in the context of separate implementations can also be implemented, in combination, in a single implementation. Conversely, various features that are described in the context of a single implementation can also be implemented in multiple implementations, separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can, generally, be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the computer-readable medium.

The invention claimed is:

1. A method, comprising:
receiving, from a user equipment (UE), a request for on-demand system information;
receiving, from the UE, a challenge response for authentication of the request for the on-demand system information, wherein the challenge response includes a response vector generated by the UE from a challenge vector for the requested on-demand system information, and the request for the on-demand system information and the challenge response are received in a same message; and
transmitting, to the UE, the on-demand system information after the request for the on-demand system information is authenticated based on the challenge response.

2. The method of claim 1, wherein the challenge vector is generated at the UE and the challenge response includes the challenge vector.

3. The method of claim 1, further comprising transmitting, to the UE, the challenge vector.

4. The method of claim 1, further comprising:
transmitting, to the UE, an indication indicating that authentication for on-demand system information is required; and
wherein the challenge response is received in response to the indication.

5. The method of claim 1, wherein the challenge response is received in response to the UE being in an attached state.

6. The method of claim 1, wherein the request for the on-demand system information is received on a Physical Random Access Channel (PRACH).

7. A base station, comprising:
at least one hardware processor;
a non-transitory computer-readable storage medium coupled to the at least one hardware processor and storing programming instructions for execution by the at least one hardware processor, wherein the programming instructions instruct the at least one hardware processor to:
receive, from a user equipment (UE), a request for on-demand system information;
receive, from the UE, a challenge response for authentication of the request for the on-demand system information, wherein the challenge response includes a response vector generated by the UE from a challenge vector for the requested on-demand system information, and the request for the on-demand system information and the challenge response are received in a same message; and
transmit, to the UE, the on-demand system information after the request for the on-demand system information is authenticated based on the challenge response.

8. The base station of claim 7, wherein the challenge vector is generated at the UE and the challenge response includes the challenge vector.

9. The base station of claim 7, wherein the programming instructions instruct the at least one hardware processor to transmit, to the UE, the challenge vector.

10. The base station of claim 7, wherein the programming instructions instruct the at least one hardware processor to:
transmit, to the UE, an indication indicating that authentication for on-demand system information is required; and
wherein the challenge response is received in response to the indication.

11. The base station of claim 7, wherein the challenge response is received in response to the UE being in an attached state.

12. The base station of claim 7, wherein the request for the on-demand system information is received on a Physical Random Access Channel (PRACH).

13. A non-transitory computer-readable medium storing instructions which, when executed, cause a computing device to perform operations comprising;
receiving, from a user equipment (UE), a request for on-demand system information;
receiving, from the UE, a challenge response for authentication of the request for the on-demand system information, wherein the challenge response includes a response vector generated by the UE from a challenge vector for the requested on-demand system information, and the request for the on-demand system information and the challenge response are received in a same message; and transmitting, to the UE, the on-demand system information after the request for the on-demand system information is authenticated based on the challenge response.

14. The non-transitory computer-readable medium of claim 13, wherein the challenge vector is generated at the UE and the challenge response includes the challenge vector.

15. The non-transitory computer-readable medium of claim 13, the operations further comprising transmitting, to the UE, the challenge vector.

16. The non-transitory computer-readable medium of claim 13, the operations further comprising:
  transmitting, to the UE, an indication indicating that authentication for on-demand system information is required; and
  wherein the challenge response is received in response to the indication.

17. The non-transitory computer-readable medium of claim 13, wherein the challenge response is received in response to the UE being in an attached state.

18. The non-transitory computer-readable medium of claim 13, wherein the request for the on-demand system information is received on a Physical Random Access Channel (PRACH).

* * * * *